United States Patent
Hinzmann et al.

(10) Patent No.: US 9,617,390 B2
(45) Date of Patent: *Apr. 11, 2017

(54) ROOM TEMPERATURE-CURING SILICONE-POLYESTER BINDER

(71) Applicant: Evonik Degussa GmbH, Essen (DE)

(72) Inventors: Dirk Hinzmann, Pulheim (DE); Barbel Wolff, Moers (DE); Thomas Klotzbach, Seligenstadt (DE); Jessica Leyers, Essen (DE); Sascha Herrwerth, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/021,192

(22) PCT Filed: Aug. 25, 2014

(86) PCT No.: PCT/EP2014/067956
§ 371 (c)(1),
(2) Date: Mar. 10, 2016

(87) PCT Pub. No.: WO2015/039838
PCT Pub. Date: Mar. 26, 2015

(65) Prior Publication Data
US 2016/0222169 A1 Aug. 4, 2016

(30) Foreign Application Priority Data
Sep. 20, 2013 (DE) .................. 10 2013 218 981

(51) Int. Cl.
| | | |
|---|---|---|
| C08G 77/22 | (2006.01) | |
| C08G 77/445 | (2006.01) | |
| C09D 183/04 | (2006.01) | |
| C08L 83/04 | (2006.01) | |
| C09D 183/10 | (2006.01) | |
| C08K 5/053 | (2006.01) | |
| C08K 5/092 | (2006.01) | |
| C08G 77/16 | (2006.01) | |
| C08K 5/544 | (2006.01) | |
| C08G 77/18 | (2006.01) | |

(52) U.S. Cl.
CPC ............ *C08G 77/445* (2013.01); *C08L 83/04* (2013.01); *C09D 183/04* (2013.01); *C09D 183/10* (2013.01); *C08G 77/16* (2013.01); *C08G 77/18* (2013.01); *C08K 5/053* (2013.01); *C08K 5/092* (2013.01); *C08K 5/544* (2013.01)

(58) Field of Classification Search
CPC .................. C08G 77/445; C09D 183/04
See application file for complete search history.

(56) References Cited

U.S. PATENT DOCUMENTS

| | | | |
|---|---|---|---|
| 4,789,710 A | | 12/1988 | Furukawa et al. |
| 5,760,155 A | * | 6/1998 | Mowrer ................. C08G 18/10 525/453 |
| 6,387,519 B1 | | 5/2002 | Anderson et al. |
| 7,361,777 B2 | | 4/2008 | Herrwerth et al. |
| 7,442,666 B2 | | 10/2008 | Herrwerth et al. |
| 7,598,334 B2 | | 10/2009 | Ferenz et al. |
| 7,605,284 B2 | | 10/2009 | Brueckner et al. |
| 7,727,599 B2 | | 6/2010 | Doehler et al. |
| 7,759,402 B2 | | 7/2010 | Venzmer et al. |
| 7,795,367 B2 | * | 9/2010 | Ziche ................. C08G 18/0895 528/28 |
| 7,834,122 B2 | | 11/2010 | Ferenz et al. |
| 7,893,128 B2 | | 2/2011 | Busch et al. |
| 7,964,694 B2 | | 6/2011 | Ferenz et al. |
| 8,030,366 B2 | | 10/2011 | Ferenz et al. |
| 8,084,633 B2 | | 12/2011 | Herrwerth et al. |
| 8,172,936 B2 | | 5/2012 | Herrwerth et al. |
| 8,211,972 B2 | | 7/2012 | Meyer et al. |
| 8,466,248 B2 | | 6/2013 | Meyer et al. |
| 8,617,529 B2 | | 12/2013 | Herrwerth et al. |
| 8,685,376 B2 | | 4/2014 | Czech et al. |
| 8,778,319 B2 | | 7/2014 | Herrwerth et al. |
| 8,841,400 B2 | | 9/2014 | Henning et al. |
| 9,138,385 B2 | | 9/2015 | Dahl et al. |
| 2005/0136269 A1 | | 6/2005 | Doehler et al. |
| 2007/0059539 A1 | | 3/2007 | Doehler et al. |
| 2007/0299231 A1 | | 12/2007 | Doehler et al. |
| 2009/0007483 A1 | | 1/2009 | Hansel et al. |
| 2010/0034765 A1 | | 2/2010 | Herrwerth et al. |
| 2010/0210445 A1 | | 8/2010 | von Rymon Lipinski et al. |
| 2011/0118406 A1 | * | 5/2011 | Mowrer ................ C09D 183/04 524/539 |
| 2011/0206623 A1 | | 8/2011 | Wenk et al. |
| 2012/0021960 A1 | | 1/2012 | Wenk et al. |
| 2013/0259821 A1 | | 10/2013 | Henning et al. |
| 2013/0267403 A1 | | 10/2013 | von Rymon Lipinski et al. |
| 2013/0331592 A1 | | 12/2013 | Hartung et al. |
| 2014/0246621 A1 | * | 9/2014 | Taniguchi .............. C08G 18/61 252/183.11 |
| 2015/0073069 A1 | | 3/2015 | De Gans et al. |

FOREIGN PATENT DOCUMENTS

| | | |
|---|---|---|
| EP | 0 274 112 A2 | 7/1988 |
| WO | WO9521206 A1 | 8/1995 |
| WO | WO0109261 A1 | 2/2001 |
| WO | WO2005100482 A1 | 10/2005 |

OTHER PUBLICATIONS

International Search Report and Written Opinion (in German) mailed Oct. 29, 2014 for PCT/EP2014/067956, 11 pages.

* cited by examiner

*Primary Examiner* — Margaret Moore

(74) *Attorney, Agent, or Firm* — Philip P. McCann; John P. Zimmer; Smith Moore Leatherwood LLP

(57) ABSTRACT

The present invention is directed to binder based on an alkoxy- and/or silanol-functional polysiloxane A), one or more dicarboxylic or polycarboxylic acids B), one or more di- or polyols C), one or more di- or polyisocyanates and one or more aminosilanes D1) or one or more isocyanatosilanes D2), the constituents A) to D1) or D2) being present condensed with one another in the binder.

7 Claims, No Drawings

ROOM TEMPERATURE-CURING SILICONE-POLYESTER BINDER

This application is a national stage application under 35 U.S.C. §371 of International Application No. PCT/EP2014/067956 filed 25 Aug. 2014, which claims priority to German Application No. DE 10 2013 218 981.8 filed 20 Sep. 2013, the disclosures of which are expressly incorporated herein by reference.

FIELD

The present invention relates to a room-temperature-curing silicone-polyester binder with hydrolysable alkoxysilyl groups, to processes for its preparation and to its use.

BACKGROUND

Binders for modern coating systems are required to fulfil a multiplicity of requirements. Accordingly they must on the one hand exhibit certain technical coating properties such as scratch resistance, hiding power and weather resistance, while on the other hand good processing qualities, economical preparation, and the fulfilment of statutory impositions are to be ensured.

EP 0274112 describes a silane-modified binder based on polyacrylate resins for the production of coating materials. A disadvantage of the binders described therein is that at sufficiently low VOC levels (Volatile Organic Compound) they frequently no longer possess the desired profile of properties—for example, inadequate weather resistance and also chemical resistance.

It is an object of the present invention to provide improved binders which can be used in order to provide long-lasting coatings.

SUMMARY

The complex object stated above is achieved by binders in accordance with the present invention.

The present invention first provides binders based on an alkoxy- and/or silanol-functional polysiloxane A), one or more dicarboxylic or polycarboxylic acids B) and one or more di- or polyols C), one or more di- or polyisocyanates and one or more aminosilanes D1) or one or more isocyanatosilanes D2), the constituents A) to D1) or D2) being present condensed with one another in the binder.

DETAILED DESCRIPTION

The stated binders are obtainable by polycondensation and also polyaddition of the abovementioned constituents A) to D1) or D2), resulting, in accordance with the invention, in two alternatives. The binders of the invention consist of five constituents when using component D1) and of four constituents when using component D2). The binder of the invention is prepared from the components stated above. The binder of the invention is a silicone-polyester hybrid binder with alkoxysilyl functionality. The term "silicone-polyester hybrid binder" is defined as a composition composed of an alkoxy- or silanol-functional branched polysiloxane which is connected via Si-O-C or Si-C linkages to organic groups or resins. The chemical attachment of the organic building blocks, such as mono- or polyhydric alcohols/polyols, for example, is via the alkoxy or silanol groups of the polysiloxane, with formation of an Si-O-C bond.

The binders of the invention have the advantage that binders are provided that overcome the disadvantages of the prior art. More particularly the binders of the invention are notable for low VOC levels of less than 250 g/L in the coating material. Moreover, when used in coatings, the binders of the invention lead to an increase in the longlastingness, to an enhanced corrosion prevention effect, and to increased chemical resistance on the part of the coatings obtained.

Constituent A) is alkoxy- and/or silanol-functional polysiloxanes. Preferably, component A) comprises non-linear, branched, alkoxy-functional and/or silanol-functional polysiloxanes, preferably those of the general formula 1,

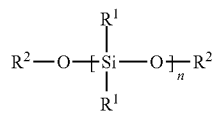

(formula 1)

in which $R_1$ independently at each occurrence are alkyl, aryl or alkoxy groups, hydroxyl or —$OSi(R_3)_3$— groups, where $R_3$ independently at each occurrence may be alkyl, aryl or alkoxy groups, hydroxyl or —$OSi(R_3)_3$— groups, and where $R_2$ independently at each occurrence may be hydrogen, alkyl groups or aryl groups, preferably alkyl groups, very preferably methyl groups or ethyl groups, and n is >1.

In formula 1, n is selected more particularly such that, depending on the nature of the selected groups $R_1$, $R_2$ and optionally $R_3$, the molecular weight Mn of the alkoxy-functional and/or silanol-functional polysiloxane is between 300 to 5100 g/mol, preferably 400 to 3000 g/mol, very preferably 450 to 1800 g/mol.

Alkyl groups are preferably linear or branched alkyl groups having 1 to 18 C atoms, and more particularly they are methyl groups.

Aryl groups are preferably aryl groups having 6 to 18 C atoms, and more particularly they are phenyl groups.

Alkoxy groups are preferably linear or branched alkoxy groups having 1 to 18 C atoms, and more particularly they are methoxy groups or ethoxy groups.

In formula 1, n is >1, meaning that the alkoxy-functional and/or silanol-functional polysiloxane has at least two —Si$(R_1)_2$—O— units as per formula 1. In this case, the radicals $R_1$, both within and between the individual —Si$(R_1)_2$—O— units, are selectable independently of one another from the groups stated above, and can therefore be combined with one another in any desired way.

The alkoxy-functional and/or silanol-functional polysiloxanes of formula 1 that are employed with preference are therefore (phenyl)methylpolysiloxanes, with methoxy-functional or ethoxy-functional (phenyl)methylpolysiloxanes being especially preferred. The alkoxy-functional and/or silanol-functional polysiloxanes of formula 1 contain preferably approximately 4 to 70 silicon atoms.

The alkoxy-functional and/or silanol-functional polysiloxanes of formula 1 may therefore contain the following structural elements:

M, $M^{OR}$, D, $D^{OR}$, T, $T^{OR}$ and Q, where:

M=[$(R_4)_3SiO_{1/2}$]

D=[$(R_4)_2SiO_{2/2}$]

T=[$(R_4)SiO_{3/2}$]

$Q=[SiO_{4/2}]$ $M^{OR}=[(R_5)_{3-m}(R_4)_m SiO_{1/2}]$ $D^{OR}=(R_5)_{2-p}(R_4)_p SiO_{2/2}]$ $T^{OR}=[(R_5)SiO_{3/2}]$ or $[(R_4)SiO_{3/2}]$, where $R_5$=aliphatic or aromatic alkoxy radical having up to 18 C atoms or hydroxyl, preferably methoxy or ethoxy, $R_4$=aliphatic or aromatic alkyl or aryl radical having up to 18 C atoms, preferably phenyl or methyl, m=0, 1, 2 or 3.

and p=0, 1 or 2.

The alkoxy and/or silanol content of the alkoxy- and/or silanol-functional polysiloxanes is between 5 and 30 wt %, preferably between 8 and 25 wt %, very preferably between 10 and 20 wt %.

Employed as component B) are dicarboxylic or polycarboxylic acids, more particularly aromatic, aliphatic or cycloaliphatic dicarboxylic or polycarboxylic acids and their derivatives, such as phthalic anhydride, isophthalic acid, terephthalic acid, adipic acid, maleic anhydride, fumaric acid, succinic anhydride, hexahydrophthalic anhydride, methylhexahydrophthalic anhydride dimethyl terephthalate, naphthalenedicarboxylic acid, cyclohexanedicarboxylic acid, hexahydrophthalic acid, succinic acid, glutaric acid, adipic acid, sebacic acid, azelaic acid, 1,12-dodecanedicarboxylic acid and 1,14-tetradecanedicarboxylic acid, and also the diesters and anhydrides thereof.

Preference is given to using phthalic anhydride, isophthalic acid, terephthalic acid and/or dimethyl terephthalate, adipic acid, maleic anhydride, fumaric acid, succinic anhydride, hexahydrophthalic anhydride, methylhexahydrophthalic anhydride as component B).

Serving as component C) are diols or polyols, more particularly aliphatic polyols such as, for example, ethylene glycol, propanediols [1,2 and 1,3], butane-1,4-diol, hexane-1,6-diol, neopentyl glycol and other neo diols (neopentyl glycol hydroxypivalate; trimethylpentanediol; polyether polyols). Examples of polyhydric alcohols which can be used are trimethylolpropane, pentaerythritol, ditrimethylolpropane, etc. As an example of cycloaliphatic polyols, use may be made of perhydrobisphenol A, dimethylolcyclohexane and 3(4),8(9)-dihydroxymethyltricyclo[5.2.1.02,6] decane (TCD Alcohol DM).

Furthermore, as components B) and C), it is also possible for monocarboxylic acids and monoalcohols to have been added in order to control the polycondensation. Examples of suitable monocarboxylic acids are benzoic acid, isononanoic acid, 2-ethylhexanoic acid, Versatic acid or saturated or unsaturated fatty acids; examples of suitable monoalcohols are 1-octanol, dodecanol, hexadecanol, 2-ethylhexanol, 2-octyldodecan-l-ol.

In one embodiment of the present invention, a binder is synthesized from an alkoxy- and/or silanol-functional polysiloxane A), one or more dicarboxylic or polycarboxylic acids B) and one or more diols or polyols C), and also one or more di- or polyisocyanates and one or more aminosilanes D1). In this way, a silicone-polyester hybrid resin is provided which has alkoxysilyl groups that are hydrolysable at room temperature. In this case, an OH-functional silicone-polyester hybrid resin is formed from components A) to C), and reacts with the di- or polyisocyanates and aminosilanes that are likewise present, to form the binder of the invention.

For example, the binder of the invention, when isophorone diisocyanate and N-(3-trialkoxysilylpropan-1-yl)-N-n-alkylamine as component D1) are used, may be described in simplified form by the general formula 2:

(formula 2)

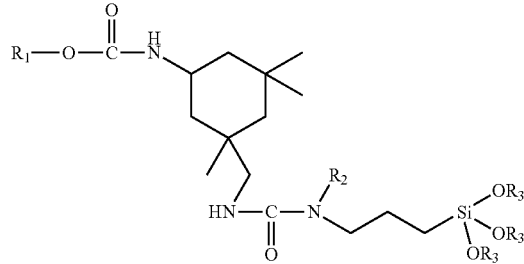

in which R1 describes the linkage to the hydroxy-functional silicone-polyester hybrid resin, R2 independently at each occurrence may be alkyl, aryl or alkoxysilylalkyl, and R3 are alkyl groups, preferably methyl or ethyl groups.

Suitable di- and/or polyisocyanates as component D1) are preferably substituted or unsubstituted aromatic, aliphatic, cycloaliphatic and/or heterocyclic polyisocyanates that are known per se. Examples of preferred di- and/or polyisocyanates are toluene 2,4-diisocyanate, toluene 2,6-diisocyanate, diphenylmethane-4,4'-diphenylene diisocyanate, diphenylmethane 2,4'-diisocyanate, hexamethylene diisocyanate, isophorone diisocyanate (Vestanat® IPDI), dicyclohexylmethyl diisocyanate (Vestanat® $H_{12}$MDI). Additionally preferred polyisocyanates are the biuret dimers and the isocyanurate trimers of the aforementioned diisocyanates.

Particularly preferred polyisocyanates are hexamethylene 1,6-diisocyanate, isophorone diisocyanate and dicyclohexylmethyl diisocyanate, their biuret dimers and/or isocyanurate trimers.

Preferred aminosilanes in components D1) are bis(3-propyltrimethoxysilyl)amine, bis(3-propyltriethoxysilyl) amine, aminopropyltrimethoxysilane, aminopropyltriethoxysilane, N-(n-butyl)-3-aminopropyltrimethoxysilane, 3-aminopropylmethyldiethoxysilane.

Corresponding aminosilanes are available for example under the names DYNASYLAN® from Evonik Industries AG and SilquestTM from Momentive.

In a further embodiment of the present invention, a binder is synthesized from an alkoxy- and/or silanol-functional polysiloxane A), one or more dicarboxylic or polycarboxylic acids B) and one or more diols or polyols C), and also one or more isocyanatosilanes D2). In this way as well, a silicone-polyester hybrid resin is provided which has alkoxysilyl groups that are hydrolysable at room temperature. Formed in turn from components A) to C) is an OH-functional silicone-polyester hybrid resin which reacts with the isocyanatosilanes, to give the binder of the invention.

For example, when 3-isocyanatopropyltrialkoxysilane is used as component D2), the alternative binder of the invention may be described in simplified form by the general formula 3:

(formula 3)

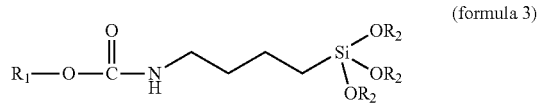

in which R1 describes the linkage to the hydroxy-functional silicone-polyester hybrid resin and R2 are alkyl groups, preferably methyl or ethyl groups.

Preferred isocyanatosilanes as component D2) are 3-isocyanatopropyltrimethoxysilane (Vestanat® EP-IPMS from Evonik Industries AG) or 3-isocyanatopropyltriethoxysilane. In the case of preferred use of such isocyanatosilanes, the modification to form a silyltrialkoxy-functional silicone-polyester may take place directly.

The binder of the invention is composed in total of a siloxane component A) and a polyester component comprising B) and C), and either of an isocyanate component and an aminosilane component D1) or an isocyanatosilane compound D2).

With more particular preference the binder of the invention is composed of 10 to 50 wt % of component A) and 50-90 wt % of a combination of the polyester component B) and C) and of the isocyanate component comprising D1) or D2), based on the solids content of the binders.

The weight ratio of component A) to the polyester constituent comprising components B) and C) is in particular 1:9 to 9:1, preferably 3:7 to 7:3. The fraction of a monoalcohol or of a monocarboxylic acid is, in particular, 2 to 20 wt %, based on the total amount of all the components. The stated weight fractions amount in total to 100 wt %.

The weight ratios of the di- or polyisocyanate component and of the aminosilanes in component D1) are situated, for the di- or polyisocyanate, at between 10-50 wt %, based on polyester resin solids, preferably at 20-40 wt %, more preferably at 25-35 wt %. The fraction of the aminosilanes in component D1) is calculated stoichiometrically in relation to the free isocyanate groups that are present for the ongoing reaction, and is situated therefore in a range of 20-80 wt %.

The fraction of the isocyanatosilane component D2) is situated at between 5-50 wt %, based on polyester resin solids, preferably at 20-40 wt %, more preferably at 25-35 wt %.

The present invention further provides a process for preparing binders in accordance with the present invention, comprising a first step of reacting an alkoxy- and/or silanol-functional polysiloxane A), one or more dicarboxylic or polycarboxylic acids B), and one or more diols or polyols C) with one another to form a silicone-polyester hybrid resin, and a second step of reacting the silicone-polyester hybrid resin obtained in the first step with one or more di- or polyisocyanates and one or more aminosilanes D1) or one or more isocyanatosilanes D2).

The first step of the process of the invention is the formation of a silicone-polyester hybrid resin. This process step takes place preferably in what is called a "one-pot synthesis" at temperatures of 80-260° C., preferably at 180-230° C.; in other words, the aforementioned components A) to C) are reacted with one another at the stated temperatures.

In the polycondensation reaction of components A) to C) it is possible additionally to use an esterification catalyst, such as Lewis acids, acids or bases, for example. Typical catalysts are organotitanium or organotin compounds such as tetrabutyl titanate or dibutyltin oxide. Also conceivable are catalysts based on other metals, such as zinc or antimony, for example, and also metal-free esterification catalysts. The amount of catalyst added is generally 0.01 to 1.0 wt %, preferably 0.05 to 0.3 wt %, based on the total amount of components A) to C).

During the polycondensation reaction, the water formed and also the alcohol are removed completely by distillation. This can be done, for example, by means of azeotropic distillation. The polycondensation reaction of the invention is continued until the target values for hydroxyl number and acid number have been reached. The solvent-free polycondensation product obtained constitutes a high-viscosity, tacky or solid material which according to its composition has different viscosities, hydroxyl numbers and acid numbers.

The desired OH number for the silicone-polyester hybrid resin is in the range from 50 to 300 mg KOH/g, preferably in the range from 80 to 230 mg KOH/g. The OH number is determined by titrimetry. The sample is acetylated with acetic anhydride in the presence of pyridine. For each hydroxyl group, one mol of acetic acid is produced, while the excess acetic anhydride yields two mols of acetic acid.

The consumption of acetic acid is determined by titrimetry from the difference between the main value and a blank value, which is to be carried out in parallel. Taking account of the number of ml of 0.5 N aqueous potassium hydroxide solution consumed in the main and blank runs, and also of the acid number of the sample and of the initial mass, the hydroxyl number is computed.

$$OHN = \frac{(b-a) \times 28.05}{E} + SZ$$

a=ml of 0.5 N aqueous potassium hydroxide solution consumed in the main run
b=ml of 0.5 N aqueous potassium hydroxide solution consumed in the blank run
E=initial mass in g The desired acid number for silicone-polyester hybrid resin is in the range from 0.1 to 20 mg KOH/g, preferably in the range from 1 to 10 mg KOH/g, very preferably 1.5 to 7 mg KOH/g. The acid number is determined likewise by titrimetry. The acid number indicates the number of mg of KOH required to neutralize the free fatty acids present in 1 g of fatty acid. An appropriate initial mass is weighed out into a glass beaker, dissolved in about 100 ml of neutralized ethanol, and titrated potentiometrically to the end point with aqueous sodium hydroxide solution. The evaluation of the acid number is determined as follows:

$$ANSZ[mgKOH/g] = \frac{V \times 56.1 \times n \times f}{E}$$

V=titrant consumed (ml)
n=normality of titrant
MW=molar mass of the acid
E=initial mass of the sample (g)
f=titrant factor The polycondensation is carried out with or without solvent, preferably in the absence of solvents.

Depending on viscosity, suitable solvents, such as n-butyl acetate, aromatic or non-aromatic solvents or other solvents, for example, may be used to adjust the solids content. Preferred solvents are more particularly: glycol ethers, such as ethylene glycol dimethyl ether, glycol ether esters, esters such as butyl glycol acetate, 3-methoxy-n-butyl acetate, butyl acetate, ethoxypropyl acetate, ketones such as methyl ethyl ketone, methyl isobutyl ketone, aromatic hydrocarbons such as xylene, Solvesso 100 and Shellsol A. Particularly suitable is butyl acetate.

Preferred is a solids content of >70 wt % more preferably >75 wt %, very preferably >85 wt %.

The molecular weights $M_n$ of the silicone-polyester hybrid resin are between 700 to 8000 g/mol, preferably 800 to 4000 g/mol.

In a further step according to the invention, the silicone-polyester hybrid resin is reacted with one or more di- or polyisocyanates and one or more aminosilanes D1) or one or more isocyanatosilanes D2).

The reaction of the silicone-polyester hybrid resin with a di- or polyisocyanate and an aminosilane D1) takes place preferably, in turn, in a two-stage operation. In the first step, the di- or polyisocyanate is reacted with the OH groups from the silicone-polyester hybrid resin, the reaction conditions being selected so as to leave sufficient NCO groups remaining for the further reaction with aminosilane. The reaction of the OH-functional silicone polyester with the di- or polyisocyanate may take place with suitable catalysts, sufficiently well known to the skilled person, at reaction temperatures from room temperature to 80° C. Examples of a number of catalysts are given below: tin compounds such as tin diacetate, tin dioctoate, dibutyltin laurate. It is also possible, furthermore, for bismuth catalysts to be used, examples being those known as Borchi catalysts. Also suitable, furthermore, are amine structures such as DABCO (1,4-diazabicyclo[2.2.2]octane). The further reaction with the aminosilane to give the silylalkoxy-functional silicone-polyester hybrid resin takes place without further catalysis.

When isocyanatosilanes D2) are used, the polyaddition may take place directly with the above-exemplified catalysts in a temperature range from room temperature to 80° C. to give the silylalkoxy-functional silicone-polyester hybrid resin.

A further subject of the present invention is the use of the binders of the invention in coatings. Coatings comprising the binders of the invention are likewise a subject of the present invention. The alkoxylsilyl-functional binder of the invention is used in particular for producing 1-component coatings, more particularly for topcoat materials, anticorrosion coating materials, here more particularly in boat building, or for general industrial coatings such as, for example, for agricultural machinery and construction machinery.

Other suitable areas of use are as protective coatings for offshore drilling platforms or bridges. The binders of the invention are suitable especially for ultra-high-solids topcoat materials featuring high weather stability and also high chemical resistance with respect to acids, bases, kerosene, petrol, diesel or Skydrol.

In the presence of atmospheric moisture, the curing of such binders takes place with suitable catalysts, generally at room temperature, with hydrolysis and condensation of the alkoxysilyl groups.

Catalysts which promote the curing of alkoxysilyl groups are well known to the skilled person. The following examples may be given: tin compounds such as tin diacetate, tin dioctoate, dibutyltin diacetylacetonate, tin tetraacetate, dibutyltin diacetate, dibutyltin dioctoate, dibutyltin dilaurate, dibutyltin dioleate, dimethoxydibutyltin, dimethyltin, dibutyltinbenzyl maleate, bis(triethoxysiloxy)dibutyltin, diphenyltin diacetate, titanium compounds, such as tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, metalloaliphatic compounds, such as lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride and cobalt diacetate. Furthermore use may also be made of bismuth catalysts, examples being the catalyst known as the Borchi catalyst, iron(II) and iron(III) compounds, examples being iron(III) acetylacetonate or iron diacetate, aluminum compounds, an example being aluminum acetylacetonate, calcium compounds, an example being calcium ethylenediaminetetraacetate, or magnesium compounds, an example being magnesium ethylenediaminetetraacetate, as catalysts.

Also suitable, furthermore, are amine structures, e.g. triethylamine, tributylamine, aminopropyltrimethoxysilane, N-(2-aminoethyl)-3-aminopropyltrimethoxysilane, tetramethylguanidine or 1,8-diazabicyclo [5.4.0.]-7-undecene, 1,4-diazabicyclo [2.2.2]octane, 1,8-diazabicyclo[5.4.0]undec-7-ene, 1,5-diazabicyclo-[4.3.0]non-5-ene, N,N-bis(N,N-dimethyl-2-aminoethyl)methylamine, N,N-dimethylcyclohexylamine, N,N-dimethylphenylamine or N-ethylmorpholine. Likewise catalytically active are tetraalkylammonium compounds, such as N,N,N-trimethyl-N-2-hydroxypropylammonium hydroxide, N,N,N-trimethyl-N-2-hydroxypropylammonium 2-ethylhexanoate or chlorine 2-ethylhexanoate. Organic or inorganic Bronsted acids as well, such as methanesulphonic acid, p-toluenesulphonic acid, dodecylbenzenesulphonic acid, 1-naphthalenesulphonic acid, camphorsulphonic acid, acetic acid, trifluoroacetic acid or benzoyl chloride, hydrochloric acid, phosphoric acid, the monoesters and/or diesters thereof, such as, for example, butyl phosphate, (iso)propyl phosphate, dibutyl phosphate etc., are suitable as catalysts. Inorganic and organic Bronsted bases as well, such as sodium hydroxide, tetramethylammonium hydroxide, potassium hydroxide, or tetrabutylammonium hydroxide, for example, are suitable as catalysts. It is of course also possible to employ combinations of two or more catalysts.

So-called photolatent bases as well are known as cross-linking catalysts, as described in WO 2005/100482. Photolatent bases are preferably organic bases having one or more basic nitrogen atoms, which initially are present in a blocked form and which release the basic form only on irradiation with UV light, visible light or IR radiation, through splitting of the molecule.

Also catalytically active are catalysts which are sold by Du Pont under the trade name Tyzor®. The same is true of catalysts of the type Kenreact® (Kenrich), Borchi Kat® (Borchers) and K-Cure®/Nacure® (King Industries).

Even without further observations, it is assumed that a skilled person is able to utilize the above description to its widest extent. The preferred embodiments and examples are therefore to be interpreted merely as a descriptive disclosure which is by no means limiting in any way whatsoever.

The present invention is elucidated in more detail below using examples. Alternative embodiments of the present invention are obtainable in an analogous way.

EXAMPLES

In the context of the present invention, the following methods have been used in addition to those measurement methods already stated above:
a) Viscosity, Determined Using Brookfield LV-DV-I+ Spindle Viscosimeter The viscosities were determined by means of a Brookfield LV-DV-I+ spindle viscosimeter. Brookfield viscosimeters are rotary viscosimeters having defined spindle sets as rotary bodies. The rotary bodies used were from an LV spindle set. Owing to the temperature dependence of the viscosity, the temperatures of the viscosimeter and of the measuring liquid were kept constant during the measurement, with an accuracy of +/−0.5° C. Further materials used in addition to the LV spindle set were a thermostatable waterbath, a 0-100° C. thermometer (scale divisions 1° C. or smaller) and a timer (scale values not greater than 0.1 second). To perform the measurement, 100 ml of the sample were introduced into a wide-necked bottle and measured under temperature-controlled conditions in the absence of air bubbles after prior calibration. To determine the viscosity, the viscosimeter was positioned relative to the sample such that the spindle dips into the product up to the mark. The measurement is initiated by activation of the start button, while care was taken to ensure that the measurement took place in the most favorable measurement region of 50% (+/−20%) of the maximum measurable torque. The result of the measurement was displayed by the viscosimeter in mPas, while division by the density (g/ml) gives the viscosity in mm²/s.

b) Determination of the Non-Volatiles Content (Determination of Solids)

Determining the amount of non-volatile fractions is done in accordance with DIN EN ISO 3251:2008; in the context of the present invention, the testing is carried out at 125° C. for 60 minutes for determining the solids.

c) Drying Time Measurements

A suitable means of assessing the catalytic activity of catalysts in a binder is to determine the drying time using a Drying Recorder. A test method of this kind is described by ASTM D5895. In analogy to this test method, drying time measurements were conducted using a BK3 Drying Recorder (The Mickle Laboratory Engineering Co. Ltd., Goose Green, Gomshall, Guildford, Surrey GU5 9LJ, UK). In this case, thin films of binder were applied to standard glass strips (30×2.5 cm×2 mm) using a four-way bar applicator (Erichsen Model 360). Beforehand, the standard glass strips were freed from adhering dust, dirt and grease with acetone and subsequently with an ethanol/DI water mixture. Using a lever on the reverse, the slide was then shifted leftwards into the start position. The scoring scribes were then folded down onto the sample glass plates. The test duration was set to 6, 12 or 24 hours, and measurement was commenced. After the end of the test duration, the scoring scribes were folded up and the glass plates were removed for assessment. The instants of initial drying and volume drying were read off using the associated timescale.

d) König Pendulum Hardness

For the König determination of pendulum hardness (DIN 53157 or EN ISO 1522), the measure used is the damping of a swinging pendulum. The pendulum with two stainless steel balls is placed on to a coating film. There is a physical relationship between the duration of pendulum swinging, amplitude, and the geometric dimensions of the pendulum. The viscoelastic behavior of the coating is the decisive factor for the hardness. When the pendulum is set in swinging motion, the balls roll on the surface and thereby exert pressure on it. The greater or lesser recovery is dependent on the elasticity. The absence of elastic forces causes severe damping of the pendulum movement. High elastic forces, in contrast, cause only little damping.

"König" pendulum hardness: Number of swings in osc.
1 oscillation=1.4 seconds e) Gloss Measurement and Gloss Retention The principle of gloss measurement is based on the measurement of the directed reflection in accordance with DIN EN ISO 2813. For this purpose, the intensity of the reflected light is measured in a narrow range of the reflection angle. The intensity of the reflected light is dependent on the material and on the incident beam angle. In the case of coating materials, more light is reflected with increasing radiation incidence. The remainder of the irradiated light penetrates the material, where, according to shade, it is partly absorbed or diffusely scattered. The measurement results of the gloss meter are based not on the quantity of light irradiated, but instead on a black, polished glass standard with a defined refractive index. For this standard, the measurement value is set at 100 gloss units (calibration). The gloss retention in % for a coating surface is computed using the following formula:

$$\text{Gloss retention in \%} = \frac{B * 100}{A}$$

B=gloss after UV exposure
A=gloss before UV exposure f) Color Difference ΔE

Delta E, often written as dE or ΔE, is a measure of the perceived color difference, which as far as possible is "equidistant" for all colors occurring. The Delta here stands as a symbol for the difference. It is possible accordingly to quantify studies which deal with colors. The color difference is normally reported as Delta E. DIN 5033 Part 2 prefers the German term Farbabstand over the German term Farbdifferenz for color difference. As opposed to the term Farbunterschied, Farbabstand (color difference) is used for the quantified form. Any color occurring in reality, including any color emitted or measured by an instrument, can be assigned a color locus within a three-dimensional space. The reason why this is possible lies in the Graßmann law.

The value of Delta E between the color loci $(L^*, a^*, b^*)_p$ and $(L^*, a^*, b^*)_v$ is calculated as a Euclidian distance in accordance with ISO 12647 and ISO 13655:

$$\Delta E_{P_3v} = \sqrt{(L^*_p - L^*_v)^2 + (a^*_p - a^*_v)^2 + (b^*_p - b^*_v)^2}$$

Evaluation of ΔE

For color differences ΔE as the Euclidian distance between the L*a*b* values (or from the polar coordinates L*C*h*), the assessment identified in the table below is customarily stated.

| ΔE | Evaluation |
|---|---|
| 0.0 . . . 0.5 | no or virtually no difference |
| 0.5 . . . 1.0 | difference may be noticeable to the trained eye |
| 1.0 . . . 2.0 | notable color difference |
| 2.0 . . . 4.0 | perceived color difference |
| 4.0 . . . 5.0 | substantial color difference, not often tolerated |
| above 5.0 | the difference is evaluated as a different color. |

In the CMC system, the value ΔE=1, is recorded as "still tolerable color deviation". Since, in spite of the improvements achieved, color spaces are in agreement with perception only in the close vicinity of the color locus, a ΔE=10 and higher should be seen preferentially as a different color.

g) QuV-A Testing

The assessment of the weather resistance of coatings is simulated by means of a QUV accelerated weathering instrument. With a UVA-340 lamp, the QUV affords the most realistic simulation of sunlight in the shortwave component of the spectrum [sunlight in the critical shortwave range between 365 nm and the lower limit for sunlight (295 nm)]. The QUV yields excellent, relative predictions about damage suffered by materials outdoors. The test is carried out as a cycling test in accordance with the ASTM G 154 standard. One cycle constitutes:

a) UV irradiation for 8 hours with a radiation intensity of 0.89 W/m² at a temperature of 60° C.
b) a condensation interval of 4 hours without UV irradiation, at 50° C.

The coating surfaces produced with the binders prepared from the examples were then exposed for a total of 1000 hours.

Example 1

In a reaction vessel, 517 g of Silres SY 231 (methoxy-functional methyl/phenylsilicone resin from Wacker), 180 g of neopentyl glycol, 180 g of trimethylolpropane, 360 g of methylhexahydrophthalic anhydride, and 270 g of 2 octyl-dodecane-l-ol are introduced and are heated to 180° C. with supply of nitrogen, with a top-mounted column attachment for the separation of the alcohol and water formed during the reaction. The temperature is raised continuously to 230° C.

After about 8 to 13 hours, the polycondensation is ended after acid numbers <5 mg KOH/g are reached. In this case the conversion is about 96%.

The silicone-polyester hybrid resin obtained is adjusted using n-butyl acetate to a solids content of 90 wt %. The characteristic numbers obtained were as follows:
Solids content: 90 wt % (1 h at 125° C.)
Viscosity: 5500 mPa*s
Acid number: 3.6 mg KOH/g
Hydroxyl number: 119 mg KOH/g

Example 2

In a reaction vessel, 80 g of DC 3074 (methoxy-functional methyl/phenylsilicone resin from Dow Corning), 41 g of adipic acid, 98.7 g of methylhexahydrophthalic anhydride, 106.3 g of neopentyl glycol and 23.8 g of ethylene glycol are introduced and are heated to 180° C. with supply of nitrogen, with a top-mounted column attachment for the separation of the alcohol and water formed during the reaction. The temperature is raised continuously to 230° C.

After about 8 to 13 hours, the polycondensation is ended after acid numbers <5 mg KOH/g are reached. In this case the conversion is about 96%.

The silicone-polyester hybrid resin obtained is adjusted using n-butyl acetate to a solids content of 80 wt %. The characteristic numbers obtained were as follows:
Solids content: 80 wt % (1 h at 125° C.)
Viscosity: 480 mPa*s
Acid number: 2.0 mg KOH/g
Hydroxyl number: 110 mg KOH/g

Example 3

Inventive

In a reaction vessel, 120.7 g of DC 3074 (methoxy-functional methyl/phenylsilicone resin from Dow Corning), 7.7 g of succinic anhydride, 93.2 g of methylhexahydrophthalic anhydride, and 128.3 g of neopentyl glycol are introduced and are heated to 180° C. with supply of nitrogen, with a top-mounted column attachment for the separation of the alcohol and water formed during the reaction. The temperature is raised continuously to 230° C. After about 8 to 13 hours, the polycondensation is ended after acid numbers <5 mg KOH/g are reached. In this case the conversion is about 96%.

The silicone-polyester hybrid resin obtained is adjusted using n-butyl acetate to a solids content of 90 wt %. The characteristic numbers obtained were as follows:
Solids content: 90 wt % (1 h at 125° C.)
Viscosity: 23,000 mPa*s
Acid number: 2.8 mg KOH/g
Hydroxyl number: 140 mg KOH/g

Example 4

Inventive

A reaction vessel with reflux condenser and dropping funnel is charged with 350 g of the hydroxy-functional silicone hybrid resin prepared from Example 1. At room temperature, with supply of nitrogen, 100.3 g of Vestanat® IPDI (isophorone diisocyanate from Evonik Industries AG) are added dropwise, and the batch is heated to 50° C. and held at the temperature for about 2 hours until the theoretical NCO value of 4.8% (based on resin solids) has been reached. The batch is cooled to room temperature and, in a separate dropping funnel, 111.4 g of N-(3-trimethoxysilylpropan-1yl)-N-n-butylamine (Dynasylan® 1189 from Evonik Industries AG) are added dropwise at a rate such that the temperature does not exceed 40° C.

When the addition is ended, the resulting binder is adjusted using a solvent mixture of 2 parts n-butyl acetate and 1 part isobutanol to a solids of 75 wt %.
Viscosity: 5000 mPa*s

Example 5

Inventive

A reaction vessel with reflux condenser and dropping funnel is charged with 200 g of the hydroxy-functional silicone hybrid resin prepared from Example 2. At room temperature, with supply of nitrogen, 57.3 g of Vestanat® IPDI (isophorone diisocyanate from Evonik Industries AG) are added dropwise, and the batch is heated to 50° C. and held at the temperature for about 2 hours until the theoretical NCO value of 4.0% (based on resin solids) has been reached. The batch is cooled to room temperature and, in a separate dropping funnel, 84.5 g of bis(3-triethoxysilylpropyl)amine (Dynasylan® 1122 from Evonik Industries AG) are added dropwise at a rate such that the temperature does not exceed 40° C. When the addition is ended, the resulting binder is adjusted using a solvent mixture of 2 parts n-butyl acetate and 1 part isobutanol to a solids of 75 wt %.
Viscosity: 1500 mPa*s

Example 6

Inventive

A reaction vessel with reflux condenser and dropping funnel is charged with 200 g of the hydroxy-functional silicone hybrid resin prepared from Example 1. At room temperature, with supply of nitrogen, 63.0 g of Vestanat® EP IPMS (3-isocyanatopropyltrimethoxysilane from Evonik Industries AG) are added dropwise, and the batch is heated to 50° C. and held at the temperature for about 3 hours until free isocyanate groups are no longer present. When the reaction is at an end, the resulting binder is adjusted with n-butyl acetate to a solids of 80 wt %.
Viscosity: 1000 mPa*s

Example 7

Inventive

A reaction vessel with reflux condenser and dropping funnel is charged with 100 g of the hydroxy-functional silicone hybrid resin prepared from Example 3. At room temperature, with supply of nitrogen, 59.5 g of Vestanat® $H_{12}$MDI (dicyclohexylmethyl diisocyanate from Evonik Industries AG) are added dropwise, and the batch is heated to 50° C. and held at the temperature for about 2 hours until the theoretical NCO value of 5.0% (based on resin solids) has been reached. The batch is cooled to room temperature and, in a separate dropping funnel, 85 g of bis(3-triethoxysilylpropyl)amine (Dynasylan® 1122 from Evonik Industries AG) are added dropwise at a rate such that the temperature does not exceed 40° C. When the addition is ended, the resulting binder is adjusted with n-butyl acetate to a solids of 80 wt %.

Viscosity: 6900 mPa*s

Preparation of a TopcoatMaterial

From the corresponding binders from Examples 4 to 7, a white-pigmented topcoat material (Table 1) and a clearcoat material (Table 2) are produced as described below.

TABLE 1

|  | White paint 1 | White paint 2 | White paint 3 | White paint 4 |
|---|---|---|---|---|
| Example 4 binder (75%) | 56.0 | | | |
| Example 5 binder (75%) | | 56.0 | | |
| Example 6 binder (80%) | | | 48.0 | |
| Example 7 binder (80%) | | | | 48 |
| Tego ® Airex 900[1] | 0.3 | 0.3 | 0.3 | 0.3 |
| Tego ® Dispers 670[2] | 0.90 | 0.9 | 0.8 | 0.8 |
| Butyl acetate | 3.6 | 3.2 | 6.3 | 14.9 |
| Isobutanol | 1.5 | 1.5 | 1.5 | 1.5 |
| Thixatrol ST[3] | 0.3 | 0.3 | 0.3 | 0.3 |
| Kronos 2315[4] | 30.0 | 30.0 | 27.0 | 27.0 |
| Blanc fixe micro[5] | 7.0 | 7.0 | 6.4 | 6.4 |
| Dynasylan ® MTMS[6] | — | — | 9.0 | — |
| Tib Kat 318[7] | 0.4 | — | 0.4 | — |
| Salicylic acid[8] | — | 0.8 | — | 0.8 |
| Total weight | 100 | 100 | 100 | 100 |
| Coating material solids | 80.0% | 80.0% | 80.0% | 80.0% |

[1]Tego Airex 900 is a deaerating agent from Evonik Industries AG
[2]Tego Dispers 670 is a dispersing additive from Evonik Industries AG
[3]Thixatrol ST is a rheological additive from Elementis
[4]Kronos 2315 is a titanium dioxide from Kronos
[5]Blanc fixe micro is a micronized barium sulphate from Sachtleben
[6]Dynasylan MTMS is methyltrimethoxysilane
[7]Tib Kat 318 is a catalyst from Tib Chemicals
[8]Salicylic acid is a catalyst

TABLE 2

|  | Clearcoat 1 | Clearcoat 2 | Clearcoat 3 | Clearcoat 4 |
|---|---|---|---|---|
| Example 4 binder (75%) | 95.0 | | | |
| Example 5 binder (75%) | | 95.0 | | |
| Example 6 binder (80%) | | | 84.0 | |
| Example 7 binder (80%) | | | | 89 |
| Butyl acetate | 4.3 | 3.6 | 1.3 | 9.6 |
| Tib Kat 218 | 0.7 | | 0.7 | |
| Salicylic acid | | 1.4 | | 1.4 |
| Dynasylan ® MTMS | | | 14.0 | |
| Total weight | 100 | 100 | 100 | 100 |

The clearcoat materials 1 to 4 were cured with the aid of the catalysts Tib Kat 318 or salicylic acid via hydrolysis/condensation reaction of the silyltrialkoxy groups. The clearcoat materials were drawn down with virtually the same dry film thickness of approximately 50 μm, and were dried for 7 days at room temperature (about 20 to 25° C.). Evaluated subsequently were König pendulum hardnesses, drying recorder drying times, and the UV stability after 1000 hours of UV-A exposure. The results of testing are summarized in Table 3.

TABLE 3

Clearcoat results

|  | Clearcoat 1 | Clearcoat 2 | Clearcoat 3 | Clearcoat 4 |
|---|---|---|---|---|
| Film thickness μm | 50 | 47 | 46 | 45 |
| Initial drying in hours | 3.5 | 6 | 4 | 1 |
| Through-drying in hours | 7 | 15 | 8 | 5 |
| König pendulum hardness in sec | | | | |
| after 4 days | 24 | 23 | 20 | 84 |
| after 7 days | 49 | 47 | 40 | 98 |
| 1000 hours of QUV-A exposure | | | | |
| Gloss retention in %, 20° angle | 94 | 100 | 95 | 97 |
| ΔE | 0.9 | 1.1 | 0.8 | 1.2 |

The chemical resistance of the white paints from Table 1 was tested. The white paints 1 to 4 were cured with the aid of the catalysts Tib Kat 318 or salicylic acid via hydrolysis/condensation reaction of the silyltrialkoxy groups. The white paints were drawn down with virtually the same dry film thickness of approximately 50 μm, and were dried for 7 days at room temperature (about 20 to 25° C.). The coatings were subsequently exposed for 8 hours to a cotton pad impregnated with the chemicals listed in Table 4, at room temperature (20 to 25° C.).

TABLE 4

Chemical resistance of white paints

|  | White paint 1 | White paint 2 | White paint 3 | White paint 4 |
|---|---|---|---|---|
| Acetic acid (10%) | 2 | 2 | 2 | 1 |
| Hydrochloric acid (10%) | 1 | 1 | 2 | 1 |
| Sulphuric acid (50%) | 1 | 1 | 2 | 1 |
| Sodium hydroxide solution (20%) | 2 | 2 | 2 | 3 |
| Hydraulic oil | 2 | 2 | 2 | 1 |
| Isopropanol | 3 | 3 | 3 | 2 |

Ranking/evaluation:
1 = no change to the film surface
2 = slight attack of the film surface
3 = severe attack of the film surface

What is claimed is:

1. A process for preparing binders, based on an alkoxy- and/or silanol-functional polysiloxane A), one or more dicarboxylic or polycarboxylic acids B), one or more di- or polyols C), one or more di- or polyisocyanates and one or more aminosilanes D1) or one or more isocyanatosilanes D2), the constituents A) to D1) or D2) being present condensed with one another in the binder, comprising the following steps:
    where in a first step an alkoxy- and/or silanol-functional polysiloxane A), one or more dicarboxylic or polycarboxylic acids B) and one or more diols or polyols C) are reacted with one another to form a silicone-polyester hybrid resin, and
    in a second step the silicone-polyester hybrid resin obtained in the first step is reacted with one or more di- or polyisocyanates and one or more aminosilanes D1) or one or more isocyanatosilanes D2).

2. The process according to claim 1, wherein aromatic, aliphatic or cycloaliphatic dicarboxylic or polycarboxylic acids and their derivatives are used as component B).

3. The process according to claim 1 wherein ethylene glycol, propanediol s, butane-1,4-diol, hexane-1,6-diol, neopentyl glycol, trimethylolpropane, pentaerythritol, ditrimethylolpropane, perhydrobisphenol A, dimethylolcyclohexane and 3(4),8(9)-dihydroxymethyltricyclo[5.2.1.02,6] decane (TCD Alcohol DM) are used as diols or polyols C).

4. The process according to claim 1, wherein component A) comprises non-linear, branched, alkoxy-functional and/or silanol-functional polysiloxanes of the general formula 1, (formula 1)

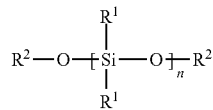

in which $R_1$ independently at each occurrence are alkyl, aryl or alkoxy groups, hydroxyl or $-OSi(R_3)_3$-groups, where $R_3$ independently at each occurrence may be alkyl, aryl or alkoxy groups, hydroxyl or $-OSi(R_3)_3$-groups, and where $R_2$ independently at each occurrence may be hydrogen, alkyl groups or aryl groups, and n is >1.

5. The process according to claim 1, wherein an esterification catalyst is used in the polycondensation reaction of components A) to D1) or D2).

6. A binders coating compositions according to the process of claim 1.

7. The binders according to the process of claim 1, wherein they are 1-component coatings.

* * * * *

UNITED STATES PATENT AND TRADEMARK OFFICE
CERTIFICATE OF CORRECTION

PATENT NO.        : 9,617,390 B2  
APPLICATION NO.   : 15/021192  
DATED             : April 11, 2017  
INVENTOR(S)       : Dirk Hinzmann et al.

Page 1 of 1

It is certified that error appears in the above-identified patent and that said Letters Patent is hereby corrected as shown below:

In the Claims

Column 15,  
Line 2, "glycol, propanediol s, butaone-1,4-diol," should read -- glycol, propanediols, butaone-1,4-diol, --.

Line 25, "6. A binders coating compositions according to" should read -- 6. A coating comprising binders according to --.

Signed and Sealed this  
Sixth Day of June, 2017

Michelle K. Lee  
*Director of the United States Patent and Trademark Office*